United States Patent [19]

Del Signore

[11] Patent Number: 5,682,136
[45] Date of Patent: Oct. 28, 1997

[54] ELECTROMAGNETIC DETECTION SYSTEM FOR PARKING OPERATION

[76] Inventor: Mauro Del Signore, Via Val della Torre, 50 I-10149 Turino (IT), Italy

[21] Appl. No.: 256,902
[22] PCT Filed: Feb. 8, 1993
[86] PCT No.: PCT/EP93/00292
§ 371 Date: Aug. 8, 1994
§ 102(e) Date: Aug. 8, 1994
[87] PCT Pub. No.: WO93/16397
PCT Pub. Date: Aug. 19, 1993

[30] Foreign Application Priority Data

Feb. 11, 1992 [IT] Italy .................................. TO92A0107

[51] Int. Cl.$^6$ .................................................. B60Q 1/00
[52] U.S. Cl. ............................ 340/436; 340/435; 340/437; 340/901; 340/903; 340/904
[58] Field of Search ................................... 340/901–905, 340/435, 436, 437

[56] References Cited

U.S. PATENT DOCUMENTS 3,717,876  2/1973  Volkers ............................ 343/712
4,803,488  2/1989  Dombrowski ..................... 340/904
5,087,918  2/1992  May et al. ......................... 342/85

Primary Examiner—Jeffery Hofsass
Assistant Examiner—Daryl C. Pope
Attorney, Agent, or Firm—Oblon, Spivak, McClelland, Maier & Neustadt, P.C.

[57] ABSTRACT

A system which provides an alarm indicative of a presence of an obstacle in a vicinity of a vehicle. The system operates by electromagnetic detection, and generates an oscillating radiofrequency signal. A transmitter transmits the generated oscillated radiofrequency signal to create, all around the transmitter, an electromagnetic radiofrequency near field. A receiver receives the electromagnetic radiofrequency near field. A detector is connected to the receiver and detects a perturbation resulting in a reduction of an oscillation amplitude of the electromagnetic radiofrequency near field, and an indicator indicates the detected perturbation of the received electromagnetic radiofrequency near field. Based on this operation, an obstacle in a vicinity of the vehicle can be detected.

30 Claims, 2 Drawing Sheets

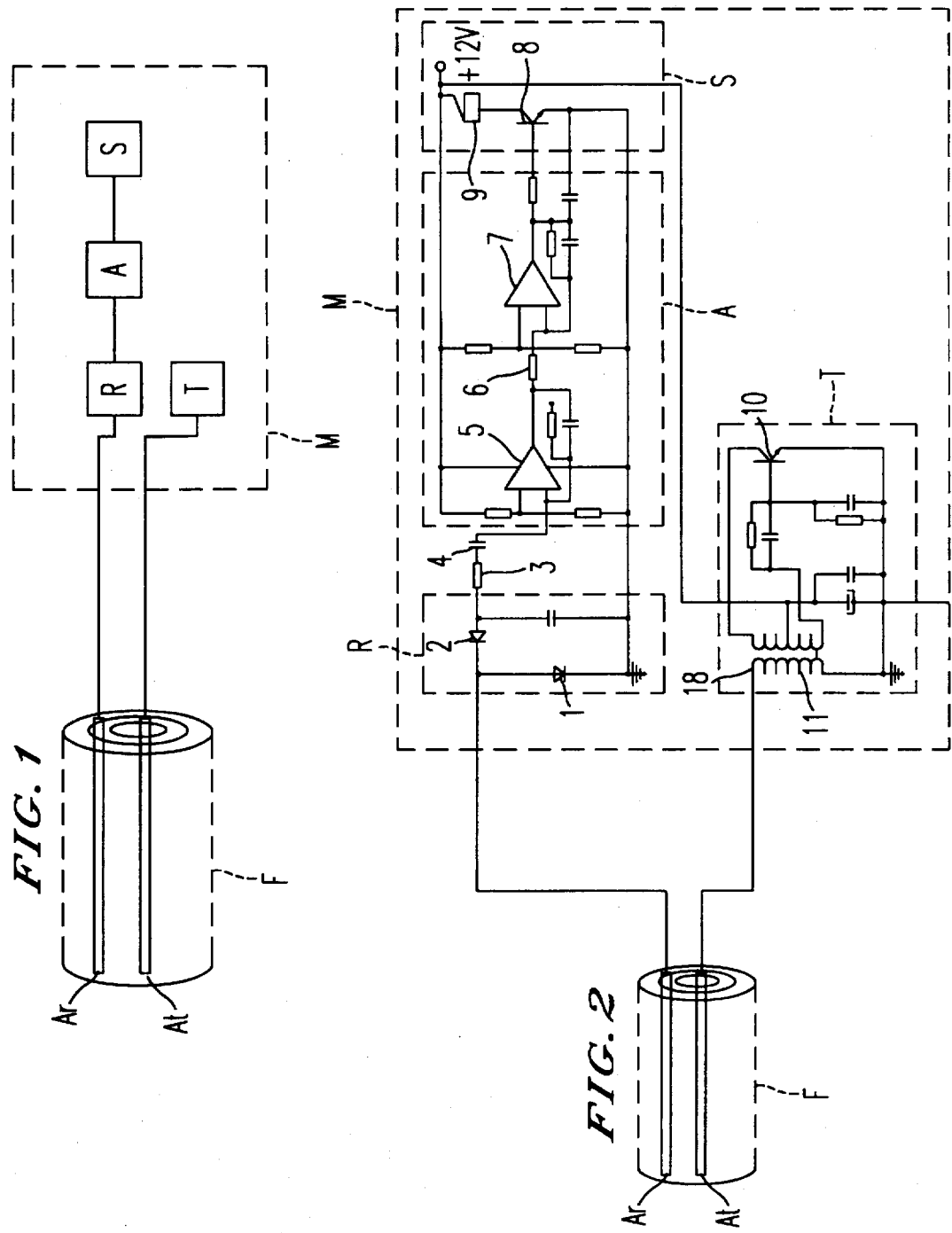

ELECTROMAGNETIC DETECTION SYSTEM FOR PARKING OPERATION

BACKGROUND OF THE INVENTION

1. Field of the Invention

This invention relates to a system able to provide an alarm signal indicative of the presence of any kind of obstacles in proximity of the part of the vehicle which has to be protected.

The application of this system becomes very usefull during parking operation and mainly for protecting the back part of the vehicle the most difficult to control from the driver seat.

2. Discussion of the Background

It is known, in the applicable art, to employ different systems for use in vehicles control during parking operation.

These systems include means vhich detect approaching obstacles by monitoring with acoustic or view signals in all the cases in which the direct perception of the driver is difficult or impossible.

It is possible to mention some examples of prior art for use with the same purpose to which the present invention relates.

For example, U.S. Pat. No. 4,278,962, is based on the use of transmitting and receiving means of ultrasonic waves. In this case the electronic system includes one or more transmitting-receiving transducers mounted outside the vehicle bumper and an electronic unit, electricaly connected to them, which decodes the acoustic waves reflected by obstacles in proximity of the vehicle and to signalize approximately the distance by digital or analogic means.

Such a system is nevertheless not always able to recognize the real distance between the ultrasonic transdoucer and the detected obstacle because the ammount of reflected ultrasonic waves (one of the parameters on which is based the distance measuring system) is dependent on the shape, density and reflective property of the obstacle.

Furthermore the ultrasonic system is unable to detect obstacles which are closer than 30–40 centimeters owing to the physical limits of the system which is based on the measurement of the time employed by the acoustic waves to return after reflection.

It is also known that the detection field, when using an ultrasonic system, has a conical shaped configuration and for this reason it is not able to protect, for example, the bumper surface for all its extension but only with an angled limitation departing from the acoustic transdoucer. For this reason, in order to obtain a more complete protection, it is necessary to use more than one acoustic transdoucer.

In addition, the prior art ultrasonic system needs the use of external sensors (acoustic transdoucers) which are visible and susceptible of handling and damagement. Furthermore the ultrasonic system is relatively expensive in its components (electronic unit, ultrasonic transdoucers).

SUMMARY OF THE INVENTION

It is an object of the present invention to overcome the problems of the prior art and to provide a practical obstacles detection system, mainly for vehicles, of low cost, easy installation, not visible outside the vehicle and able to give an alarm signal when an obstacle is approaching the part of the vehicle which has to be protected, with the following benefits:

Detection of the obstacles approaching the vehicle with absolute continuity for all the extension of the part which has to be protected (for example the bumper).

Detection of the obstacles not depending on their physical properties as shape, dimensions, density and reflective propriety.

Continuity of the obstacles detection from the maximum detection distance up to the contact without the blind zone (30–40 centimeters before the contact) which characterizes the prior art systems.

Increment of the detection sensitivity as the obstacle distance decreases which guarantees a more prompt alarm signal for very short approaching movements in the close proximity.

Low cost.

For this purpose, according to the present invention, the electromagnetic detection system is characterized in that it employs, in its preferred embodiment, a transmitting-receiving mean consisting of two wires or strps of electrical conductive material (antennas) coupled together; a means capable of generating an electromagnetic field (near field) of radio frequency all around this transmitting-receiving means; a means capable of detecting (demodulate) the variations of said electromagnetic field caused by an object which is approaching to said transmitting-receiving means; a means giving an acoustic or wiev alarm signal in presence of such electromagnetic field variation.

BRIEF DESCRIPTION OF THE DRAWINGS

The invention will now be described, in his preferred embodiment, in more details with reference to the accompanying drawings, in which:

FIG. 1 is a general block diagram of the apparatus of the preferred embodiment of the invention.

FIG. 2 is an electrical circuit schematic diagram of the apparatus of the preferred embodiment of the invention.

DESCRIPTION OF THE PREFERRED EMBODIMENTS

Figure 4:
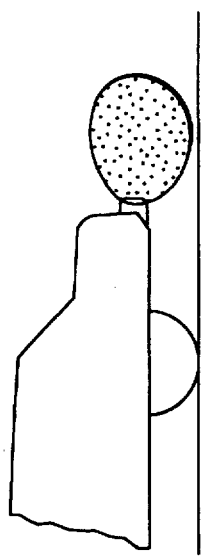
FIGS. 4,5 and 6 show respectively the diagrammatic configuration of the section view, the side view and the upper view of the electromagnetic detection field generated around the car bumper when employing the preferred embodiment of the present invention used as parking control.

Referring now to the enclosed drawings, the apparatus employing the system object of the present invention is mainly composed, in a preferred embodiment, of two parts: one electronic units M and one electromgnetic radio frequency field F. In more detail, in FIG. 1, At symbolizes the transmitting antenna connected with the radio frequency oscillator T and Ar simbolyzes the receiving antenna connected with the revealation device R, A symbolizes the signal amplifier and S the acoustic module for alarm signal.

The electrical circuit of FIG. 2 is a preferred application example of the general block diagram of FIG. 1. In it the transmitting-receiving means is constituted by two simple coupled electrical wires like, for example, a Television flat antenna 300 Ohm cable.

In both the drawings is diagrammatically shown with F the electromagnetic near field which, expanding all around said transmitting antenna At, encloses said receiving antenna Ar which is connected to the said revelation unit R where 1 and 2 are, for example, two germanium diodes used to demodulate the amplitude variation of the electromagnetic signal captured by the antenna Ar. To said revelation unit R is connected, through the resistor 3 and the capaciotor 4, amplifier A; the function of the resistor and capacitor is to cut continuous components of the radio frequency signal in order to transfer, to the amplifier A, or better, to the first operational amplifier 5, only the alternate component of the signal caused by the variation of the electromagnetic field F. In this manner it is possible to obtain a self-adjusting condition of the circuit in order that slow variations of some parameters (external temperature, power supply voltage, length and coupling characteristic of antennas) are not affecting the reliability of the electronic circuit.

Furthermore said amplifier A includes, beside few resistors and capacitors, the resistor 6 which applies the revealed signal to the second operational amplifier 7 for a further amplification. Said amplifier A is connected to the acoustic module S which includes the transistor 8 which provides the output to the acoustic transducer 9 for the audible alarm signal.

Said transmitting antenna At is connected to the said radio frequency oscillator T which, in this example, mainly comprises one transistor 10 and one coil 11 in order to generate radio frequency oscillations, e.g. below 150 KHz, coupled to the second coil 12, but may alternatively be any kind of radio frequency free-oscillator.

Figure 3:
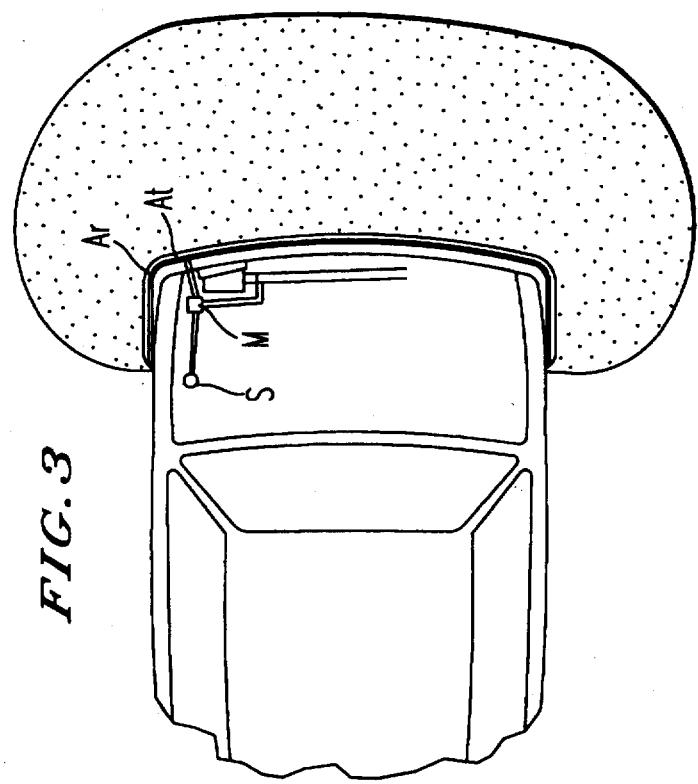
FIG. 3 shows an example of automotive installation of the system, object of the present invention, for use as vehicle parking control in the back side of the vehicle.

The electronic unit now described is encapsulated in a small size module which can be easily arranged, for example, inside the vehicle close to the reverse gear lamp from which it can receive the power supply of 12 Vdc during the parking operation (see FIG. 3).

To said module will be connected to the two antennas At and Ar which will be easily arranged, for example, inside the plastic bumper. To this purpose it could be used a two wire electric cable where the distance between the two wires may be possibly not less than 4-5 millimeters.

Figure 5:
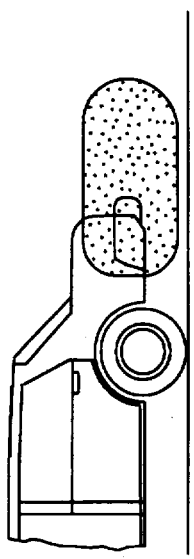
Figure 6:
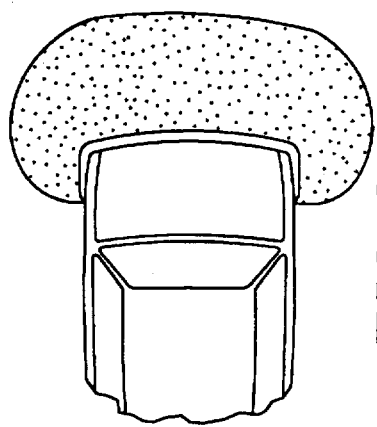

According to the present invention, this preferred embodiment of the system installed on a vehicle ensures, when the circuit is switched on, the generation of a near electromagnetic field F all around the transmitting antenna At. Due to the proximity of the conductive material of the vehicle and to the particular arrangement of the antenna At, the space configuration of this electromagnetic near field appears as diagrammatically shown in FIGS. 4,5,6. The receiving antenna Ar that, in this case, is immerged in said electromagnetic field will receive this radio frequency signal of constant amplitude. When any object, with the only exclusion of substances with very low electrical conductivity (glass, ceramic, plastic with clean surfaces), enters this electromagnetic field, this generates a field parameters perturbation and consequentely causes a reduction of the oscillations amplitude which, in this particular case, will be detected by the receiving antenna Ar and applied to the revealation module R and transformed, through the said amplifier A, in an audible alarm signal produced by the said acoustic module S.

It is to be appreciated that the foregoing description is of a preferred embodiment of the invention which can be modified in various ways without departing from the spirit and scope of the invention which could widely be changed in its circuitry characteristics and in its applications field.

For example, the system object of the present invention could be utilized as a body detector for use in walking-through access controls devices, as a proximity sensor for use in close/open doors, to actuate illumination or alarm systems and furthermore, with the use of antenna cables of appropriate length, for perimetral protection systems.

Furthermore, with appropriate improvements of the basilar electronic circuit, it could be used as a warning device for predetemined approaching distances in vehicular or objects movement.

I claim:

1. An electromagnetic detection system for detecting obstacles during a vehicle parking operation, comprising:
    a generating means for generating an oscillating radiofrequency signal;
    a transmitting means connected to the generating means and receiving the radiofrequency signal and for transmitting the radiofrequency signal to create, all around said transmitting means, an electromagnetic radiofrequency near field;
    a receiving means for receiving the electromagnetic radiofrequency near field;
    a detecting means connected to the receiving means for detecting a perturbation resulting in a reduction of oscillation amplitude of said electromagnetic radiofrequency near field received by the receiving means; and
    an indicator means connected to the detecting means for indicating the detected perturbation of the received electromagnetic radiofrequency near field.

2. The electromagnetic detection system as claimed in claim 1, wherein the transmitting and receiving means are formed by two wires of electrical conductive material, used as antennas, coupled together.

3. The electromagnetic detection system as claimed in claim 1, wherein the means for generating the radiofrequency signal includes an electronic oscillator coupled to the transmitting means.

4. The electromagnetic detection system as claimed in claim 3, wherein the electronic oscillator comprises one transistor, connected to a first coil, which generates a radiofrequency oscillation which is inductively transferred to a second coil connected to the transmitting means.

5. The electromagnetic detection system as claimed in claim 1, wherein the detecting means comprises a revealation unit coupled to the receiving means.

6. The electromagnetic detection system as claimed in claim 5, wherein the revealation unit comprises two revealation diodes which demodulate the electromagnetic radiofrequency signal received by the receiving means.

7. The electromagnetic detection system as claimed in claim 1, wherein the detecting means comprises an acoustic transducer.

8. The electromagnetic detection system as claimed in claim 5, wherein the detecting means comprises an electronic amplifier comprising first and second operational amplifiers.

9. The electromagnetic detection system as claimed in claim 8, further comprising a resistor and a capacitor connected between said revealation unit and said amplifier to give a self-adjustment to the detecting means to avoid instability or malfunctioning due to changes in external temperature and voltage supply.

10. The electromagnetic detection system as claimed in claim 1, wherein each of the generating means, transmitting means, receiving means, detecting means and indicator means are encapsulated in a module electrically connected to a reverse gear lamp for power supply.

11. The electromagnetic detection system as claimed in claim 5, wherein the revealation unit comprises two revealation diodes which demodulate the electromagnetic radiofrequency signal received by the receiving antenna.

12. An electromagnetic detection system for detecting obstacles during a vehicle parking operation comprising:

a generator generating an oscillating radiofrequency signal;

a transmitting antenna connected to the generator and receiving the radiofrequency signal and transmitting the radiofrequency signal to create, all around said transmitting antenna, an electromagnetic radiofrequency near field;

a receiving antenna receiving the electromagnetic radiofrequency near field;

a detector connected to the receiving antenna and detecting a perturbation resulting in a reduction of oscillation amplitude of said radiofrequency near field received by the receiving antenna; and an indicator connected to the detector and indicating the detected perturbation of the received electromagnetic radiofrequency near field.

13. The electromagnetic detection system as claimed in claim 12, wherein the transmitting and receiving antennas are formed by two wires of electrical conductive material coupled together.

14. The electromagnetic detection system as claimed in claim 12, wherein the generator includes an electronic oscillator coupled to the transmitting antenna.

15. The electromagnetic detection system as claimed in claim 14, wherein the electronic oscillator comprises one transistor, connected to a first coil, which generates a radiofrequency oscillation which is inductively transferred to a second coil connected to the transmitting antenna.

16. The electromagnetic detection system as claimed in claim 12, wherein the detector comprises a revealation unit coupled to the receiving antenna.

17. The electromagnetic detection system as claimed in claim 12, wherein the detector comprises an acoustic transducer.

18. The electromagnetic detection system as claimed in claim 16, wherein the detector comprises an electronic amplifier comprising first and second operational amplifiers.

19. The electromagnetic detection system as claimed in claim 18, further comprising a resistor and a capacitor connected between said revealation unit and said amplifier to give a self-adjustment to the detector to avoid instability or malfunctioning due to changes in external temperature and voltage supply.

20. The electromagnetic detection system as claimed in claim 12, wherein each of the generator, transmitting antenna, receiving antenna, detector and indicator are encapsulated in a module electrically connected to a reverse gear lamp for power supply.

21. An electromagnetic detection system for detecting obstacles during a vehicle parking operation, comprising:

a generator generating an oscillating radiofrequency signal;

a transmitting antenna connected to the generator and receiving the radiofrequency signal and transmitting the radiofrequency signal to create, all around said transmitting antenna, an electromagnetic radiofrequency near field;

a receiving antenna receiving the electromagnetic radiofrequency near field;

a detector connected to the receiving antenna and detecting a perturbation resulting in a reduction of oscillating amplitude of said electromagnetic radiofrequency near field received by the receiving antenna; and an indicator connected to the detector and indicating the detected variation in the amplitude of the received electromagnetic radiofrequency near field.

22. The electromagnetic detection system as claimed in claim 21, wherein the transmitting and receiving antennas are formed by two wires of electrical conductive material coupled together.

23. The electromagnetic detection system as claimed in claim 21, wherein the generator includes an electronic oscillator coupled to the transmitting antenna.

24. The electromagnetic detection system as claimed in claim 23, wherein the electronic oscillator comprises one transistor, connected to a first coil, which generates a radiofrequency oscillation which is inductively transferred to a second coil connected to the transmitting antenna.

25. The electromagnetic detection system as claimed in claim 21, wherein the detector comprises a revealation unit coupled to the receiving antenna.

26. The electromagnetic detection system as claimed in claim 25, wherein the revealation unit comprises two revealation diodes which demodulate the amplitude of the electromagnetic radiofrequency signal received by the receiving antenna.

27. The electromagnetic detection system as claimed in claim 21, wherein the detector comprises an acoustic transducer.

28. The electromagnetic detection system as claimed in claim 25, wherein the detector comprises an electronic amplifier comprising first and second operational amplifiers.

29. The electromagnetic detection system as claimed in claim 28, further comprising a resistor and a capacitor connected between said revealation unit and said amplifier to give a self-adjustment to the detector to avoid instability or malfunctioning due to changes in external temperature and voltage supply.

30. The electromagnetic detection system as claimed in claim 21, wherein each of the generator, transmitting antenna, receiving antenna, detector and indicator are encapsulated in a module electrically connected to a reverse gear lamp for power supply.

* * * * *